Jan. 28, 1930.                S. E. MILNE                1,745,179
                AUXILIARY FUEL TANK FOR MOTOR VEHICLES
                    Filed Feb. 11, 1928        2 Sheets-Sheet 1
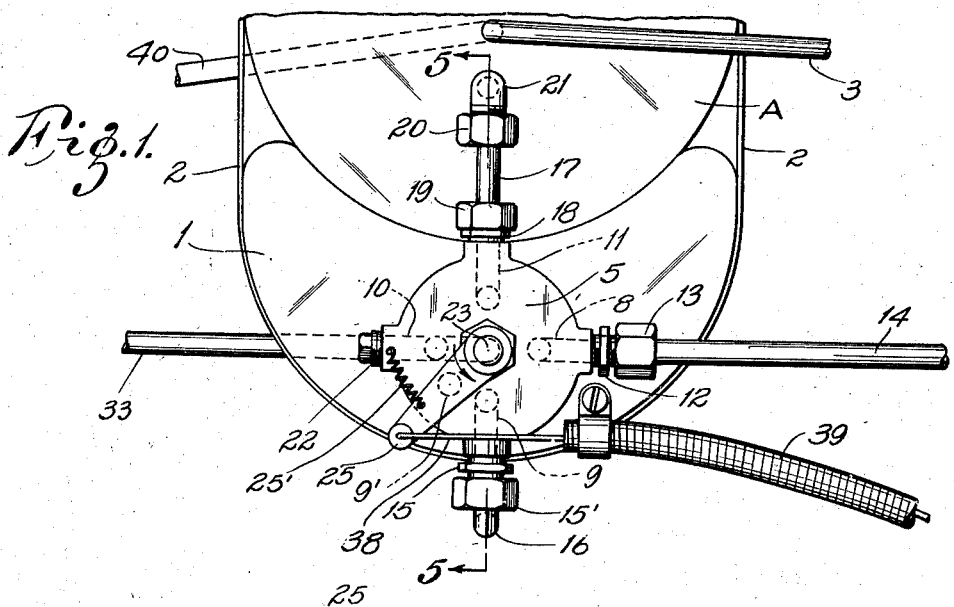
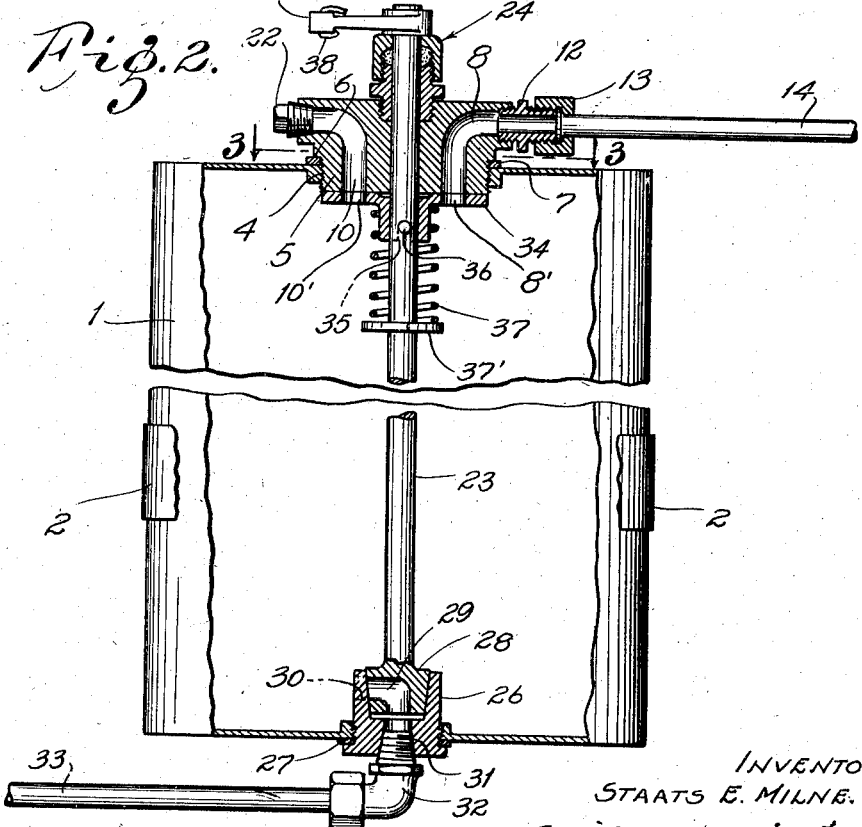
INVENTOR.
STAATS E. MILNE.
By Elliott Harrington
ATTORNEYS Jan. 28, 1930.                S. E. MILNE                1,745,179
            AUXILIARY FUEL TANK FOR MOTOR VEHICLES
                     Filed Feb. 11, 1928        2 Sheets-Sheet 2
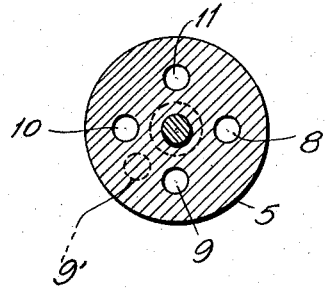
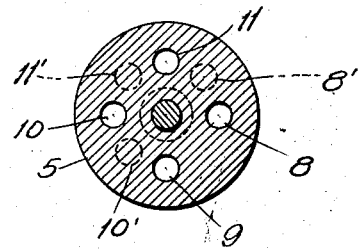
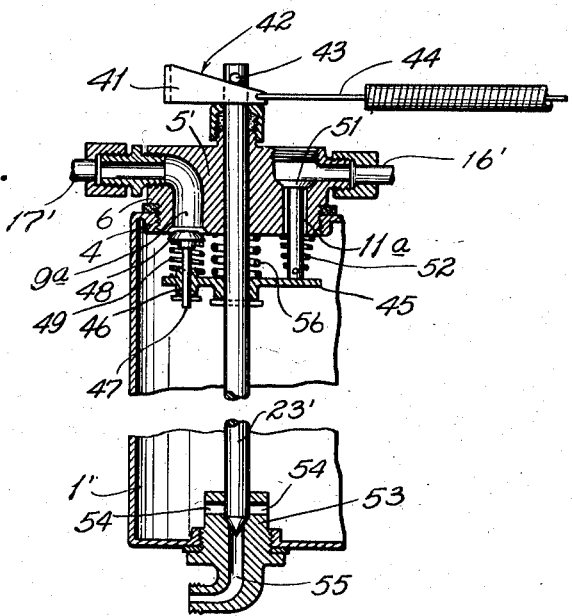
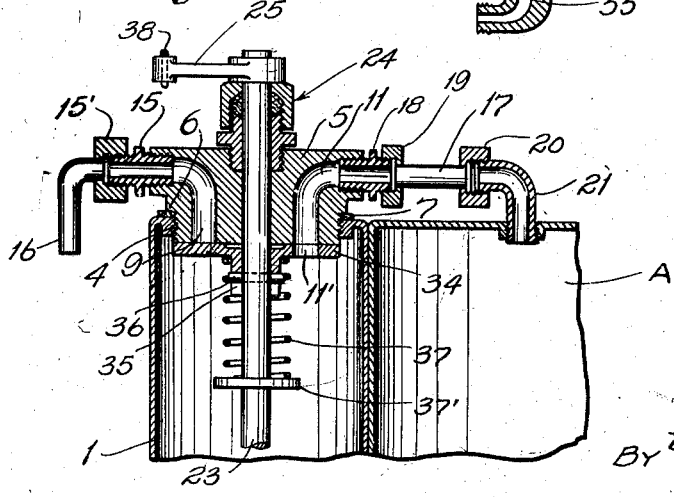
INVENTOR:
STAATS E. MILNE.
By Elliott r Harrington
ATTORNEYS Patented Jan. 28, 1930

1,745,179

UNITED STATES PATENT OFFICE

STAATS E. MILNE, OF ST. LOUIS, MISSOURI

AUXILIARY FUEL TANK FOR MOTOR VEHICLES

Application filed February 11, 1928. Serial No. 253,746.

This invention relates to auxiliary fuel tanks for motor vehicles, and has for its main object the provision of a reserve fuel tank which may be conveniently connected to the vacuum tank of the fuel feeding system of a motor vehicle and which will be automatically filled by the operation of the vacuum feed tank. In the operation of a fuel feeding system provided with my improved auxiliary fuel tank, a reserve supply of gasoline or other liquid being used as fuel is trapped in the auxiliary tank and is maintained therein at all times during the normal operation of the motor vehicle, from which reserve supply liquid fuel is conducted to the carburetor of the motor vehicle in the event the supply of fuel in the main tank and in the vacuum tank is exhausted.

An important feature of the invention resides in the fact that a valve is provided which controls communication between the vacuum tank and the auxiliary tank, which valve is moved to a closed position when the valve controlling the flow of fuel from the reserve tank is moved to an open position. The mechanism of the invention is such that actuation of the two valves referred to takes place simultaneously and through the operation of a single controlling means, and as the fuel may not be withdrawn from the auxiliary tank without shutting off communication between the vacuum tank and the auxiliary tank, there is no likelihood that the operation of the vacuum tank will interfere with the flow of fuel by gravity from the auxiliary tank, as was the case with devices of the type disclosed herein which were known heretofore.

Figure 1 is a plan view of by improved auxiliary tank showing same in association with a vacuum tank of a motor vehicle, a portion of said vacuum tank being broken away to conserve space;

Figure 2 is a view of the auxiliary tank shown partly in elevation and partly in vertical section;

Figure 3 is a cross-section on line 3—3 of Fig. 2;

Figure 4 is a view similar to Fig. 3, but showing the valve in a moved position;

Figure 5 is a section on line 5—5 of Fig. 1;

Figure 6 illustrates a modified form of the invention.

In the drawing, which illustrates one embodiment merely of my invention, A designates an ordinary vacuum tank of a fuel feeding system of a motor vehicle, and 1 designates my improved auxiliary or reserve liquid fuel tank, which is preferably, though not necessarily, secured to the vacuum tank A in any suitable manner, as by means of suitable bands 2 which embrace said vacuum tank and said auxiliary tank. The auxiliary tank is preferably more or less crescent-shaped so that it may fit in close contact with the outer face of the vacuum tank, as shown in Fig. 1. As is well known, suction is created in the vacuum tank A by arranging same in communication with the intake manifold of the engine of the motor vehicle, and in the present invention, the instrumentality by which this communication is effected comprises a tube 3, said tube being connected at one of its ends to the upper portion of the vacuum tank and at its other end to the intake manifold of the engine (not shown).

Arranged in the top wall of the auxiliary tank 1 is a screwthreaded aperture 4 which is adapted to receive the externally screwthreaded lower end portion of a valve 5, said valve being provided with a shoulder 6 between which and the top wall of the auxiliary tank a gasket 7 is arranged to provide a fluid-tight joint at that point. The valve 5 is provided with a plurality of passageways which lead from the peripheral face of said valve to the lower face thereof, said passageways being extended radially and downwardly with respect to the valve, as shown in Figs. 1 and 2 and bearing the reference characters 8, 9, 10, and 11, respectively. The valve 5 is provided with internally screwthreaded bosses on its peripheral face at the respective passageways, and 12 designates a nipple which is screwed into the boss associated with the passageway 8. 13 designates a coupling member by means of which a tube 14 is connected with said nipple and thereby placed in communication with the passageway 8 in the valve 5.

15 designates a nipple which is screwed into the internally screwthreaded boss associated with the passageway 10, and 15' designates a coupling member which serves to connect a tube 16 to said nipple. The tube 16 functions as an air-vent for the auxiliary fuel tank 1, it being plain that when the valve is positioned properly to permit it, air may pass into the auxiliary tank through said tube to permit withdrawal of liquid therefrom.

Extended between the auxiliary fuel tank and the vacuum tank A so that said tanks may be arranged in communication with each other is a tube 17, said tube being connected by means of a nipple 18 and coupling member 19 to the valve 5 to cause said tube to be in communication with the passageway 11 in said valve, and the tube 17 at its opposite end being connected to the vacuum tank A through the instrumentality of the coupling member 20 and elbow 21. The passageway 10 formed in the valve 5 is closed at its outer end by means of a plug 22, as shown clearly in Fig. 2.

The valve 5 is provided with a centrally arranged opening formed therethrough through which a valve stem 23 passes, said valve stem being rotatable within said opening and being extended through a stuffing box 24 associated with said valve. Fixed to the valve stem 23 at the upper end thereof is an operating arm 25 by means of which said stem may be rotated. Formed in the lower wall of the auxiliary fuel tank 1 is a screwthreaded aperture in which a valve housing 26 having a screwthreaded portion is arranged, said valve housing having a gasket 27 associated with it to provide a fluid-tight joint between the valve housing and the lower wall of the tank 1. The lower end of the valve stem 23 is provided with a valve head 28, said valve head being provided with an angular passageway 29 formed therethrough and the valve housing being provided with an aperture 30 with which the passageway 29 may be caused to register. The valve housing 26 is provided with a screwthreaded opening 31 arranged in communication with the angular passageway 29 at the lower end thereof and screwed into this opening is an elbow 32 to which a tube 33 is connected by means of a suitable coupling member. The tube 33 leads to the carburetor of the motor vehicle of which the fuel feeding system forms a part.

Arranged at the lower end of the valve 5 is a disk 34 having a hub portion in which a transverse groove 35 is formed, and 36 designates a pin which is extended through the valve stem 23 so that its opposite end portions are located in the transverse groove 35, as shown clearly in Fig. 2. Because of this arrangement, it is plain that the disk 34 will rotate with the valve stem 23 when axial movement is imparted thereto, and also due to the pin and groove connection between the disk 34 and the valve stem 23, said disk is capable of slight vertical movement with respect to said valve stem. The disk 34 is forced into very firm contact with the lower face of the valve 5 by a coil spring 37 one end of which contacts with said disk and the opposite end of which contacts with a collar or other device 37' mounted on the valve stem. The disk 34 is provided with a plurality of apertures formed therethrough, said apertures being designated by the reference characters 8', 9', 10', and 11', and being capable of being moved into and out of registration with the passageways 8, 9, 10, and 11 when the disk is rotated.

38 designates an operating member which is connected to the arm 25 at the outer end thereof, as shown in Fig. 1, said operating member, if desired, being extended through a flexible tube 39 and having attached thereto an operating element which will be arranged preferably at the instrument board of the motor vehicle, or elsewhere if desired, convenient to the operator of the motor vehicle. Leading from the lower end of the vacuum tank A is a tube 40, said tube being extended to the carburetor of the motor vehicle whereby fuel will be conducted from said vacuum tank to said carburetor.

In the operation of a motor vehicle equipped with my improved fuel feeding system, liquid fuel will pass from the main fuel supply tank (not shown in the drawings) through the tube 14 to the valve 5, and when the disk 34 is positioned to permit it, said fuel will pass through the passageway 8 into the reserve tank 1. When the reserve tank 1 has been filled and liquid fuel continues to be drawn through the tube 14, said fuel will pass through the passageway 11 in the valve 5 and through the tube 17 into the vacuum tank A. In the normal operation of a motor vehicle, the vacuum tank A having the usual amount of gasoline therein, suction in said vacuum tank will draw fuel from the main fuel supply tank through the tube 14 and through the filled reserve tank and tube 17 to the vacuum tank A, whence said fuel will pass to the carburetor of the motor vehicle through the tube 40 in the usual manner.

Assume, now, that the supply of fuel in the main supply tank has been exhausted. In this event fuel would be drawn from the auxiliary tank into the vacuum tank until the level of the fuel within the auxiliary tank dropped below the disk 34, whereupon passage of fuel from said auxiliary tank to the vacuum tank would cease and the engine of the motor vehicle would continue to operate only until the fuel within the vacuum tank had been exhausted.

When the engine of the motor vehicle has stopped because of the absence of fuel in the main supply tank and in the vacuum tank, the operator of the motor vehicle will operate the member 38 with the aid of the conveniently situated operating element associated therewith, whereupon the valve stem 23 will be rotated axially. Under ordinary operating conditions, that is, when fuel is being drawn from the main fuel supply tank, the apertures 8', 10', and 11' are in registration with the passageways 8, 10, and 11. However, when the operating member 38 is operated as just described, the valve stem 23 is rotated, whereby the disk 34 is moved so that said apertures 8', 10', and 11' are located out of registration with the passageways 8, 10, and 11, and so that solid portions of the disk 34 are located at the lower ends of said passageways. At the same time, the aperture 9', which is normally out of registration with the passageway 9, is moved into registration with said passageway, thus providing for the passage of air into the auxiliary tank through the tube 16. In like manner, when the valve stem 23 is rotated, the passageway 29 in the valve head 28 at the lower end of said valve stem will be moved into registration with the aperture 30 in the valve housing 26, thus opening communication between the interior of the auxiliary tank and the tube 33 leading to the carburetor, and liquid fuel will flow by gravity from the auxiliary fuel tank to the carburetor, air passing into the tank through the tube 16 to permit withdrawal of liquid therefrom.

It is obvious, in view of the above explanation, that as communication between the vacuum tank and the auxiliary tank is broken by closing the passageway 11 in the valve 5, the suction created in the vacuum tank by the operation of the engine of the motor vehicle will not interfere with the free flow by gravity of fuel from the auxiliary tank 1, as would be the case if this communication were not broken.

If desired, when a flexible operation member 38 is employed, a coil spring 25' may be attached to the arm 25 to return same to its normal position after same has been moved and the force tending to retain said arm in its moved position has been relieved.

The purpose of the passageway 10, which in the drawing is sealed by the plug 22, is to permit of my improved device being associated with motor vehicles having tubes leading from the main fuel supply tanks thereof (the tube 14 in the drawings) which approach the vacuum tanks at the right or left hand sides thereof. In the event the tube 14 would be on the opposite side of the valve 5 to that in which it is shown in Fig. 2, said tube would be connected to the passageway 10 and the plug 22 would be used to seal the passageway 8.

In Fig. 6, I show a modified form of the invention in accordance with which the valve stem 23' is moved upwardly by a member 41 which is provided with a cam face 42, said member 41 being moved with respect to the upper end portion of the valve stem 23' in a manner to cause the cam face 42 to impart upward movement to a pin 43 carried by the valve stem 23'. Movement is imparted to the member 41 by an operating member 44 provided with an operating element which is located in a position convenient to the position of the operator of the motor vehicle.

5' designates a valve provided with a plurality of passageways two of which are shown in Fig. 6, the two passageways being the passageway 11ª associated with an air tube 16' provided an air-vent for the auxiliary tank 1', and a passageway 9ª associated with a tube 17' leading to the vacuum tank (not shown in Fig. 6). The valve 5' is also provided with a passageway corresponding to the passageway 8 shown in Figures 1 to 4 with which is associated a valve corresponding to the valve 48 shown in Figure 6 and hereinafter to be referred to, but as such structure is quite obvious illustration thereof is considered unnecessary.

Mounted on the valve stem 23' is a disk 45 which is provided with socket 46 arranged to receive the stem 47 of a valve 48, said valve 48 having a coil spring 49 associated with it which tends to move same upwardly, and the valve stem being provided with a cotter pin adapted to limit upward movement of the valve. At the lower end of the passageway 9ª, I provide a valve seat adapted to receive the valve 48 to close said passageway.

Arranged in the passageway 11ª is a valve 51 adapted to seat against a valve seat at the upper end of said passageway, said valve having a coil spring 52 associated with it which tends to draw said valve downwardly into contact with the valve seat. The lower face of the valve stem associated with the valve 51 contacts with the disk 45.

At the lower wall of the auxiliary tank 1' is a valve housing 53 into which the lower end of the valve stem 23' extends, said lower end of said valve stem being tapered to provide a needle valve which contacts with a tapered valve seat formed in said valve housing. Also, the valve housing, which is in the form of an elbow to which a tube leading to the carburetor of the motor vehicle (not shown) may be attached, is provided with apertures 54 which communicate with a main passageway 55 formed through said valve housing.

In the operation of the form of the invention shown in Fig. 6, the valve stem 23' will be elevated against the action of the spring 56 by movement of the member 41, as already described, whereupon the valve 48 will be moved into contact with its seat, thus closing communication between the auxiliary tank 1' and the vacuum tank and at the same time the valve 51 will be moved to an open position to permit air to pass through the tube 16' into the tank 1'. Likewise, on upward movement of the valve stem 23', the lower tapered end of the valve stem will be moved off of its seat to permit fuel to flow from the tank 1' through the apertures 54 and passageway 55 to the carburetor.

While I have disclosed the valve 5 as being constructed and arranged so that communication between the main fuel supply tank and the auxiliary tank is broken when said valve is operated to permit fuel to flow from said auxiliary tank, this need not be so as the device will operate just as efficiently when communication between said tanks is not broken when fuel is drawn from the auxiliary tank, and I wish my claims to be interpreted with this in mind.

I claim:

1. In combination with a fuel feeding system, a vacuum tank, a reserve supply tank arranged in communication with said vacuum tank, a tube leading directly to said reserve supply tank from the source of supply of the fuel through which tube fuel introduced into said vacuum tank passes, a tube leading to the carburetor of the fuel feeding system from said reserve supply tank, a valve for controlling passage of fuel from said reserve supply tank to the carburetor of the fuel feeding system, and a valve for controlling communication between said reserve supply tank and said vacuum tank, said valves being cooperatively connected for simultaneous actuation.

2. In combination with a fuel feeding system, a vacuum tank, a reserve supply tank arranged in communication with said vacuum tank, a tube leading directly to said reserve supply tank from the source of supply of the fuel through which tube fuel introduced into said vacuum tank passes, a tube leading to the carburetor of the fuel supply system from said reserve supply tank, a valve for controlling passage of fuel from said reserve supply tank to the carburetor of the fuel feeding system, a valve for controlling communication between said reserve supply tank and said vacuum tank, and a single operating member adapted for manual operation at a point remote from said valves for actuating said valves simultaneously.

3. In combination with a fuel feeding system, a vacuum tank, a reserve supply tank, a conductor whereby said reserve supply tank is arranged in communication with said vacuum tank, a conductor leading to said reserve supply tank from the source of supply of the fuel, a conductor leading to the carburetor of the fuel feeding system from said reserve supply tank, a conductor providing an air-vent for said reserve supply tank, means for controlling passage through the various conductors, and means for simultaneously actuating said means.

4. In combination with a fuel feeding system, a vacuum tank, a reserve supply tank, a conductor leading to said reserve supply tank from the source of supply of the fuel, a conductor leading to the carburetor of the fuel feeding system from said reserve supply tank, a valve for controlling passage through said conductor, a conductor whereby said reserve supply tank is arranged in communication with said vacuum tank, a passageway providing an air-vent for the reserve supply tank, a valve whereby passage through the last mentioned conductor and said passageway is controlled, and means whereby said valves may be operated simultaneously.

5. In combination with a fuel feeding system, a vacuum tank, a reserve supply tank, a conductor leading to the carburetor of the fuel feeding system from said reserve supply tank, a valve for controlling passage through said conductor, a conductor whereby said reserve supply tank is arranged in communication with said vacuum tank, a conductor providing an air-vent for the reserve supply tank, a conductor leading to said reserve supply tank from the source of supply of the fuel, a valve whereby passage through the three last mentioned conductors is controlled, and means whereby said valves may be operated simultaneously.

In testimony whereof, I have hereunto set my hand.

STAATS E. MILNE.